(12) United States Patent
Li et al.

(10) Patent No.: US 9,026,167 B2
(45) Date of Patent: May 5, 2015

(54) PICOCELL RANGE EXPANSION CONFIGURATION ON AUTHORIZED SHARED ACCESS

(71) Applicant: Nokia Corporation, Espoo (FI)

(72) Inventors: Haitao Li, Beijing (CN); Kodo Shu, Beijing (CN); Huiyue Yi, Shanghai (CN); Rui Wang, Shanghai (CN); Honglin Hu, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 13/781,885

(22) Filed: Mar. 1, 2013

(65) Prior Publication Data

US 2014/0248919 A1    Sep. 4, 2014

(51) Int. Cl.
*H04B 7/00* (2006.01)
*H04W 52/38* (2009.01)
*H04W 28/16* (2009.01)
*H04W 72/04* (2009.01)
*H04W 16/02* (2009.01)

(52) U.S. Cl.
CPC ............. *H04W 52/38* (2013.01); *H04W 28/16* (2013.01); *H04W 72/0406* (2013.01); *H04W 16/02* (2013.01)

(58) Field of Classification Search
CPC . H04W 28/16; H04W 72/0406; H04W 28/18; H04W 72/04; H04W 16/32; H04W 52/244; H04W 84/045
USPC .......... 455/522, 69, 507, 500, 517, 445, 449, 455/422.1, 403, 426.1, 426.2, 436–444, 455/448, 550.1, 450, 509, 452.1–453; 370/236, 236.1, 237, 235, 241.1, 252, 370/310, 328, 329, 331, 338

See application file for complete search history.

(56) References Cited

U.S. PATENT DOCUMENTS

2012/0087247 A1*  4/2012  Min et al. ...................... 370/237
2013/0250764 A1*  9/2013  Vasudevan et al. ........... 370/235

FOREIGN PATENT DOCUMENTS

WO    2012/158548 A1    11/2012

OTHER PUBLICATIONS

Sayandev Mukherjee et al., "Effects of Range Expansion and Interference Coordination on Capacity and Fairness Heterogeneous Networks", DOCOMO Communications Laboratories USA, Inc., IEEE, Nov. 6, 2011, pp. 1855-1859.

(Continued)

*Primary Examiner* — Keith Ferguson
(74) *Attorney, Agent, or Firm* — Squire Patton Boggs (US) LLP

(57) ABSTRACT

An apparatus, system, and method for a communication network that includes a picocell range expansion configuration on authorized shared access. A method may include determining, in a controller, at least one allowable maximal range expansion bias value for at least one picocell within a coverage area of a macrocell. The method may also include sending the determined allowable maximal range expansion bias value for the at least one picocell from the controller to the macrocell. A further method may include receiving at least one allowable maximal range expansion bias value for at least one picocell from a controller. The method may also include updating, by a macrocell, a range expansion bias value for each picocell within a macrocell based on the received allowable maximal range expansion bias value.

20 Claims, 6 Drawing Sheets

(56) References Cited

OTHER PUBLICATIONS

Katsunori Kikuchi et al., "Proposal of Adaptive Control CRE in Heterogeneous Networks", IEEE 23rd International Symposium on Personal, Indoor and Mobile Radio Communications, Sep. 9, 2012, pp. 910-914.

David Lopez-Perez et al., "On the Expanded Region of Picocells in Heterogeneous Networks", IEEE Journal of Selected Topics in Signal Processing, vol. 6, No. 3, Jun. 2012, pp. 281-294.

European Search Report application No. 14155894.0 dated Sep. 11, 2014.

\* cited by examiner

PICOCELL RANGE EXPANSION CONFIGURATION ON AUTHORIZED SHARED ACCESS

BACKGROUND

1. Field

Certain embodiments relate to communication systems, such as Third Generation Partnership Project (3GPP) Long Term Evolution (LTE). More particularly, certain embodiments relate to a Range Expansion Bias (REB) reconfiguration method for LTE macro-pico Heterogeneous Networks (HetNets) in Authorized Shared Access (ASA)-aided spectrum sharing environments which can avoid causing harmful interference to any primary systems.

2. Description of the Related Art

With the evolution of LTE to LTE-advanced, carrier aggregation (CA) may be used to address wide bandwidth requirements. However, some operators have rather a limited amount of spectrum resources to be used for LTE, which conventionally makes it difficult to provide a high data rate for LTE systems. Therefore, some LTE systems are attempting to exploit more additional licensed spectrum as an extension of existing LTE licensed spectrum.

In one aspect, managing smaller cells (picocells, femtocells, and relays, etc.) in conventional macrocell networks is expected to provide better quality of service. With good deployment, capacity increases from low power nodes can be significantly improved. In another aspect, cognitive radio (CR) technology has been developed to allow unlicensed users to exploit spectrum opportunities from primary systems to enhance the spectrum utilization greatly. Authorized Shared Access (ASA) is a spectrum authorization scheme intended to solve spectrum scarcity on LTE band and spectrum under-utilization on additional licensed bands. ASA is intended to allow for a shared use of spectrum using cognitive radio technologies (for example, geo-location databases, sensing, and the like) based on an individual authorization model of spectrum rights, and can act as a regulatory enabler to making available, in a timely manner, harmonized spectrum for mobile broadband while overcoming time, resource and political constraints.

The introduction of picocells in a macro network may create an imbalance between the downlink and uplink coverage. The downlink coverage area of a Pico evolved Node B (PeNB) may be much smaller than that of a Macro evolved Node B (MeNB) due to factors such as low transmit power. However, the uplink coverage areas of different base stations (BSs) can be similar since the size of the coverage area may mainly depend on the user transmit power. On the other hand, PeNB resources may be not fully utilized due to the small number of pico users (PUE). To address these two issues, the 3GPP can use Cell Range Expansion (CRE) through biasing handover criteria between MeNBs and PeNBs on the same carriers. Using CRE, the cell association rule in the presence of picocells is based on the maximum downlink received power with a Range Expansion Bias (REB). This mechanism allows for flexible load balancing and sufficient resource utilization, and the REB values are configured by the MeNB to balance the traffic load between macrocell and picocell. Conventionally, the Almost Blank Subframe (ABS) is utilized to avoid inter-cell interference on both data and control channels of the downlink.

SUMMARY

According to a first embodiment, a method may include determining, in a controller, at least one allowable maximal range expansion bias value for at least one picocell within a coverage area of a macrocell. The method may also include sending the determined at least one allowable maximal range expansion bias value for the at least one picocell from the controller to the macrocell.

According to a second embodiment, an apparatus may include at least one processor and at least one memory including computer program code. Further, the at least one memory and the computer program code are configured to, with the at least one processor, cause the apparatus at least to determine, in a controller, at least one allowable maximal range expansion bias value for at least one picocell within a coverage area of a macrocell. Also, the at least one memory and the computer program code are configured to, with the at least one processor, cause the apparatus at least to send the determined at least one allowable maximal range expansion bias value for the at least one picocell from the controller to the macrocell.

According to a third embodiment, a method may include receiving at least one allowable maximal range expansion bias value for at least one picocell from a controller. The method may also include updating, by a macrocell, at least one range expansion bias value for at least one picocell within a macrocell based on the received at least one allowable maximal range expansion bias value.

According to a fourth embodiment, an apparatus may include at least one processor and at least one memory including computer program code. Further, the at least one memory and the computer program code are configured to, with the at least one processor, cause the apparatus at least to receive at least one allowable maximal range expansion bias value for at least one picocell from a controller. Also, the at least one memory and the computer program code are configured to, with the at least one processor, cause the apparatus at least to update, by a macrocell, at least one range expansion bias value for at least one picocell within a macrocell based on the received at least one allowable maximal range expansion bias value.

According to a fifth embodiment, an apparatus may include determining means for determining, in a controller, at least one allowable maximal range expansion bias value for at least one picocell within a coverage area of a macrocell. The apparatus may also include sending means for sending the determined at least one allowable maximal range expansion bias value for the at least one picocell from the controller to the macrocell.

According to a sixth embodiment, an apparatus may include receiving means for receiving at least one allowable maximal range expansion bias value for at least one picocell from a controller. The apparatus may also include updating means for updating, by a macrocell, at least one range expansion bias value for at least one picocell within a macrocell based on the received at least one allowable maximal range expansion bias value.

According to a seventh embodiment, a non-transitory computer readable medium may be encoded with instruction that, when executed in hardware, perform a process, the process including the method according to the first embodiment.

According to an eighth embodiment, a non-transitory computer readable medium may be encoded with instruction that, when executed in hardware, perform a process, the process including the method according to the third embodiment.

According to a ninth embodiment, a system may include a controller and a macrocell, including at least one picocell. In the system, the controller may include at least one processor and at least one memory including computer program code. Further, the at least one memory and the computer program code are configured to, with the at least one processor, cause the controller at least to determine at least one allowable maximal range expansion bias value for the at least one picocell within a coverage area of the macrocell. Also, the at least one memory and the computer program code are configured to, with the at least one processor, cause the controller at least to send the at least one determined allowable maximal range expansion bias value for the at least one picocell from the controller to the macrocell. In the system, the macrocell may include at least one processor and at least one memory including computer program code. Further, the at least one memory and the computer program code are configured to, with the at least one processor, cause the macrocell at least to receive the at least one allowable maximal range expansion bias value for at least one picocell from the controller. Also, the at least one memory and the computer program code are configured to, with the at least one processor, cause the macrocell at least to update at least one range expansion bias value for at least one picocell within a macrocell based on the received at least one allowable maximal range expansion bias value.

BRIEF DESCRIPTION OF THE DRAWINGS

For proper understanding of the invention, reference should be made to the accompanying drawings, wherein.

DETAILED DESCRIPTION

Certain embodiments relate to a range expansion bias (REB) configuration method for LTE macro-pico HetNets in ASA-aided spectrum sharing environments. Such a method may configure the REB values of picocells through the coordination among the ASA controller, the MeNB, and the PeNBs so as to avoid or reduce unnecessary interference to the primary systems.

In order to avoid causing unnecessary interference to the primary system, a REB configuration method for LTE macro-pico HetNets in ASA-aided spectrum sharing environments may be utilized. Unlike the conventional scheme where the REB values of picocells are configured by the MeNB only to balance the traffic load between macro cell and picocells, certain embodiments address not only balancing the traffic load between macro cell and picocells, but also avoiding causing unnecessary interference to the primary system.

Certain embodiments involve configuring the REB values of picocells based on coordination between the ASA controller and the MeNB. This scheme can include, among other things, three aspects: (1) the MeNB reports the identities (IDs) of its neighbor picocells in its coverage range to the ASA controller; (2) the ASA controller determines an allowable maximal REB value for each picocell to avoid causing unnecessary interference to the primary systems, and informs the MeNB in the form (picocell's ID, allowable maximal REB value); and (3) the MeNB utilizes these allowable maximal REB values of picocells to configure an updated REB value for each picocell.

In the first aspect discussed above, location information of the picocells may be optionally reported by the MeNB if the ASA controller has not stored the location information. Further, the MeNB can optionally report currently used the REB value (if any) for each picocell.

In "Authorized Shared Access", a requirement may be that the secondary system will not cause unnecessary interference to the primary system.

Figure 1:
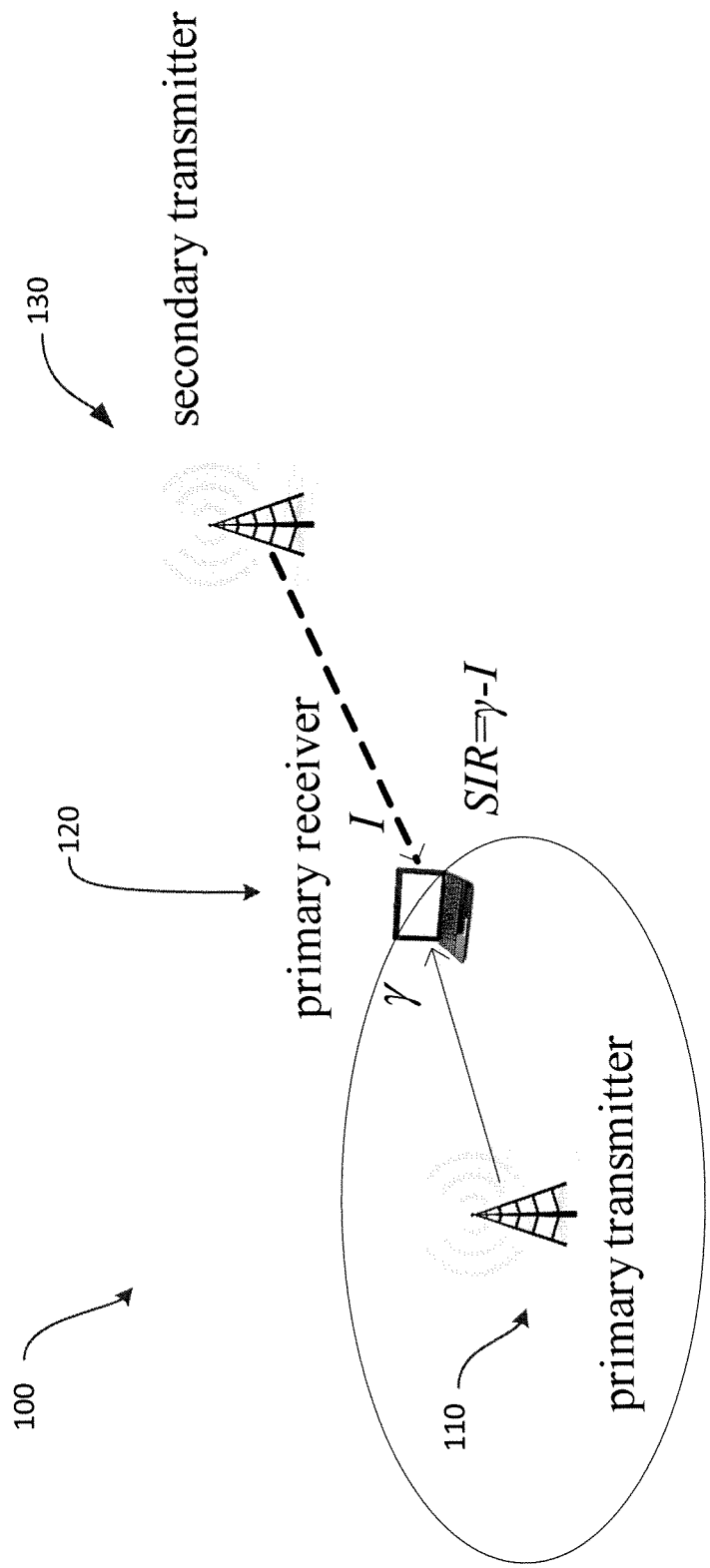
FIG. 1 illustrates interference to primary receivers caused by secondary transmitter according to certain embodiments.

FIG. 1 illustrates interference to primary receivers caused by secondary transmitter according to certain embodiments. FIG. 1 shows a system 100 having Interference (I) to Primary Receiver (PR) 120 caused by secondary transmitter 130. The Signal-to-Interference Ratio (SIR) at the PR can be calculated as $SIR=\gamma-I$, where $\gamma$ is the instantaneous primary received signal power at any location transmitting from primary transmitter (PT) 110 and I represents the interference at PR 120 created by secondary transmitter 130. Assuming the required SIR of the PR is $SIR_0$, the system can be designed so that the condition $SIR \geq SIR_0$ is satisfied, to avoid causing unnecessary interference to the primary system by the secondary system.

Figure 2:
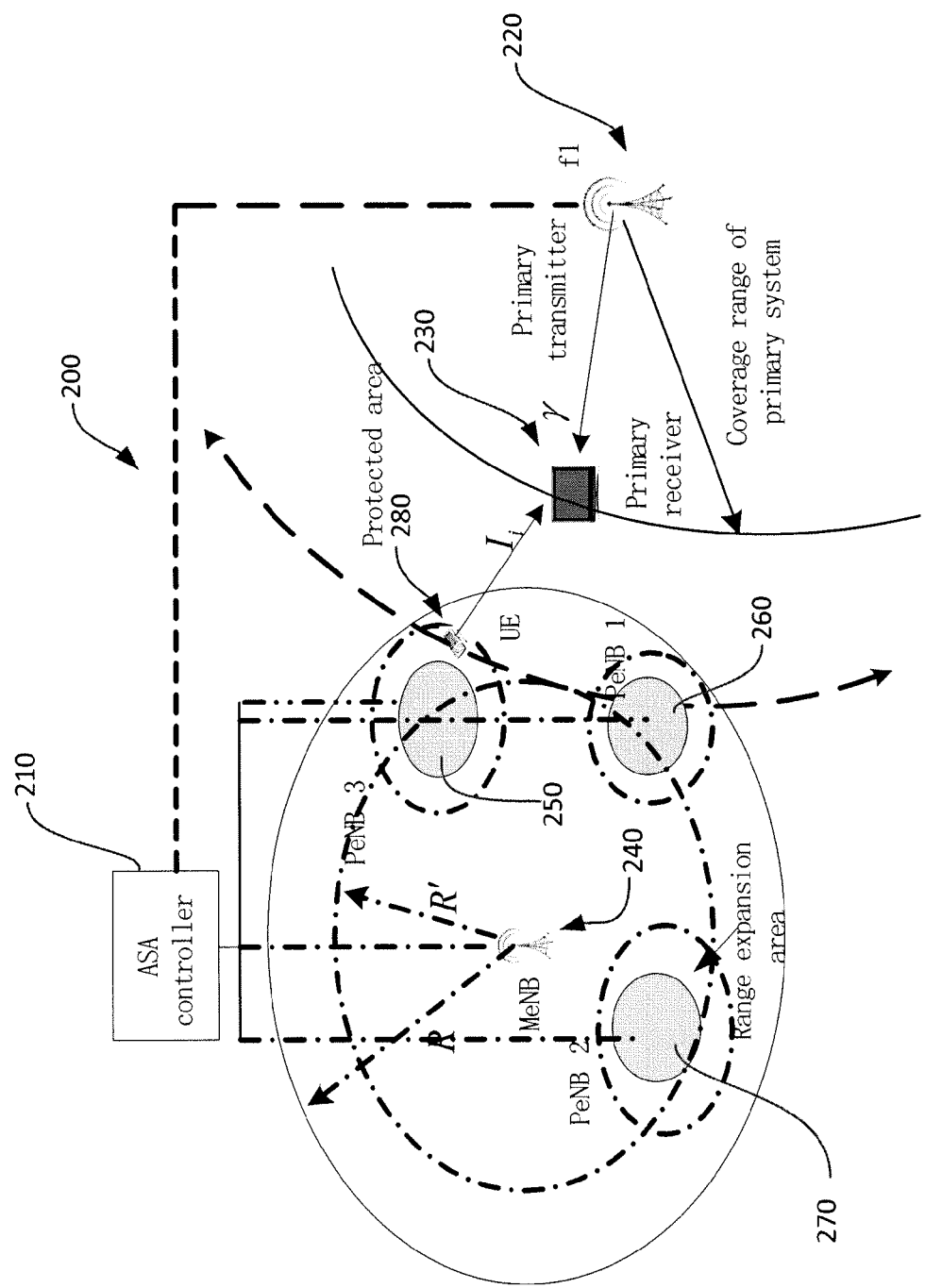
FIG. 2 illustrates macro-pico HetNet deployment in ASA-aided spectrum sharing environments according to certain embodiments.

FIG. 2 illustrates macro-pico HetNet deployment in ASA-aided spectrum sharing environments 200, where the secondary macro-pico HetNets share the frequency with the primary system. Assuming there are two available carriers: (1) existing LTE carrier f0, and (2) the ASA carrier f1.

Both MeNB 240 and PeNBs (250, 260, 270) are connected with ASA controller 210 for ASA spectrum management. Initially, it is assumed that the primary system does not utilize frequency band f1. In this case, the following assumptions may be made: (1) MeNB 240 uses LTE carrier f0 as primary cell (PCell) providing system information, and aggregates the ASA carrier f1 as secondary cell (SCell) for providing high-rate user data for UEs 280 and (2) all three picocells (PeNB 1, 260; PeNB 2, 270; and PeNB 3, 250) are deployed on the ASA carrier f1 as hotspots. In addition, it is assumed that the REB value of the picocell i is $\alpha_{REB,i}$.

At some point in time, primary system 220 can request to reutilize the carrier f1 at certain specific areas (for example, primary system's "protected area" shown in FIG. 2). As the coverage range of MeNB 240 partially overlaps with the primary system's protected area, MeNB 240 will cause unnecessary interference to primary system 220. Therefore, ASA controller 210 will inform MeNB 240 to reduce its transmit power on ASA carrier. Then, MeNB 240 will reduce its coverage from R to R' (see FIG. 2) to avoid unnecessary interference to primary system. As to the picocells in the MeNB's coverage range, there are three cases listed in Table 1:

TABLE 1

Three cases as to picocells

| case | picocell | Whether picocell's non-extended range is inside primary system's protected area? | Whether picocell's extended area is inside primary system's protected area? |
|---|---|---|---|
| Case 1 | picocell 1 | yes | yes |
| Case 2 | picocell 2 | no | no |
| Case 3 | picocell 3 | no | yes |

The picocell's non-extended range is determined by the picocell's transmit power. Therefore, for case 1 (PeNB 1, 260), ASA controller 210 needs to directly inform the PeNB 1, 260 to vacate the ASA carrier f1 because its non-extended range is inside of the primary system's protected area. For macro radio offloading, picocell's range expansion area is usually determined by the REB value which is configured by the MeNB's Radio Resource Management (RRM) algorithm. However, in ASA spectrum, for case 3 (PeNB 3, 250), picocell UEs 280 using the ASA carrier f1 in the PeNB 3's extended area will cause unnecessary interference to primary system 220. Therefore, there is a need to consider how to reconfigure the PeNB 3's range expansion bias (REB) value to avoid or reduce the likelihood UEs 280 in the PeNB 3's extended area will not cause unnecessary interference to primary system 220.

Figure 3:
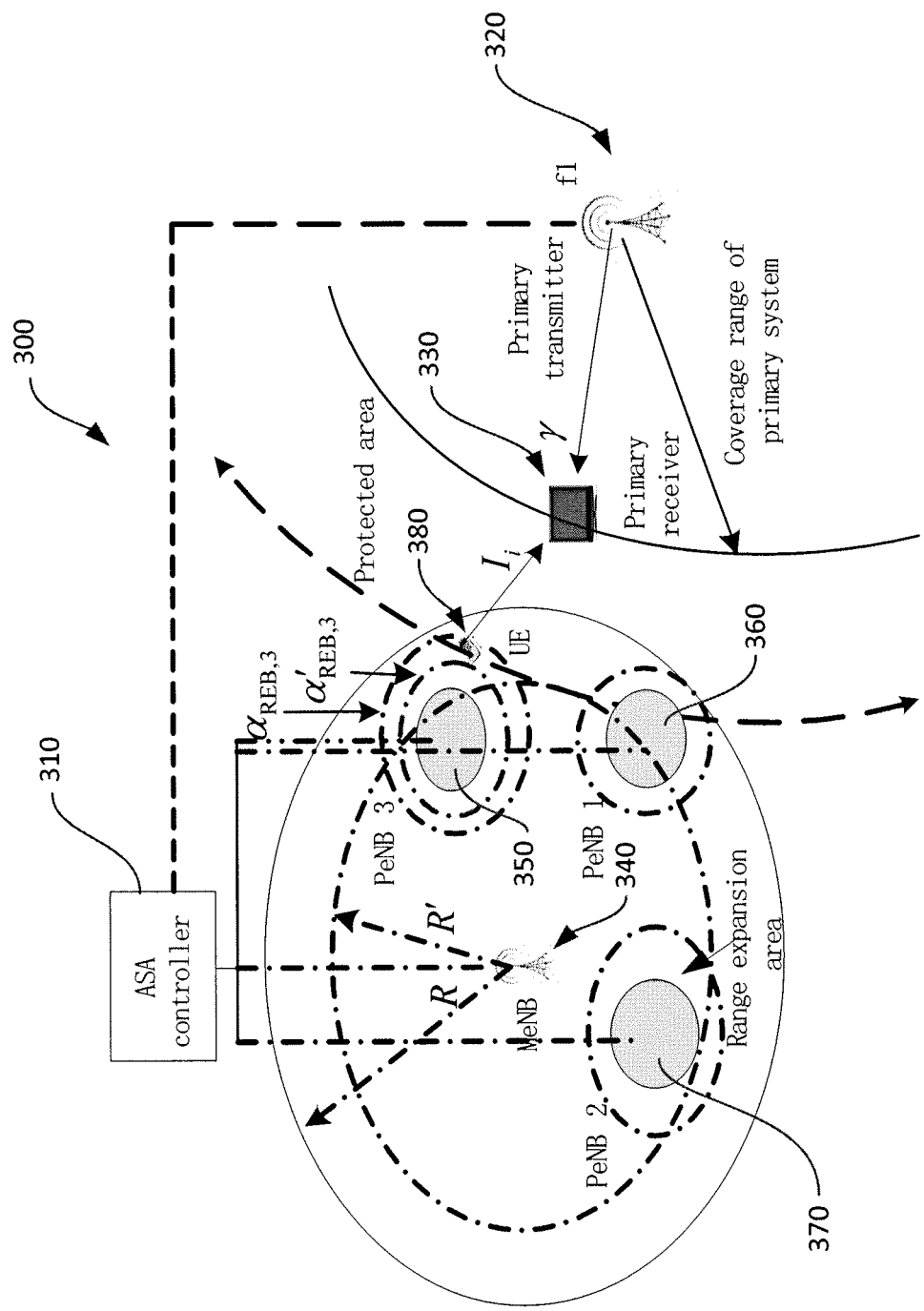
FIG. 3 illustrates a Range Expansion Bias (REB) configuration method for LTE HetNets in ASA-aided spectrum sharing environments according to certain embodiments.

FIG. 3 illustrates a Range Expansion Bias (REB) configuration method for LTE HetNets in ASA-aided spectrum sharing environments 300 according to certain embodiments. FIG. 3 shows the REB configuration for LTE macro-pico HetNets in ASA-aided spectrum sharing environments, where the REB value of PeNB 3, 350 is determined as the allowable maximal value $\alpha'_{REB,3}$ (small dotted circle around PeNB 3 in FIG. 3) by ASA controller 310 to avoid or sufficiently reduce causing unnecessary interference to primary system 320.

Certain embodiments provides a range expansion bias (REB) configuration method for LTE macro-pico HetNets in ASA-aided spectrum sharing environments, which aims to configure the REB values of picocells through the coordination among ASA controller 320, MeNB 340, PeNBs (350, 360, 370) and UEs 380, which may help to avoid or reduce unnecessary interference to primary system 320.

Figure 4:
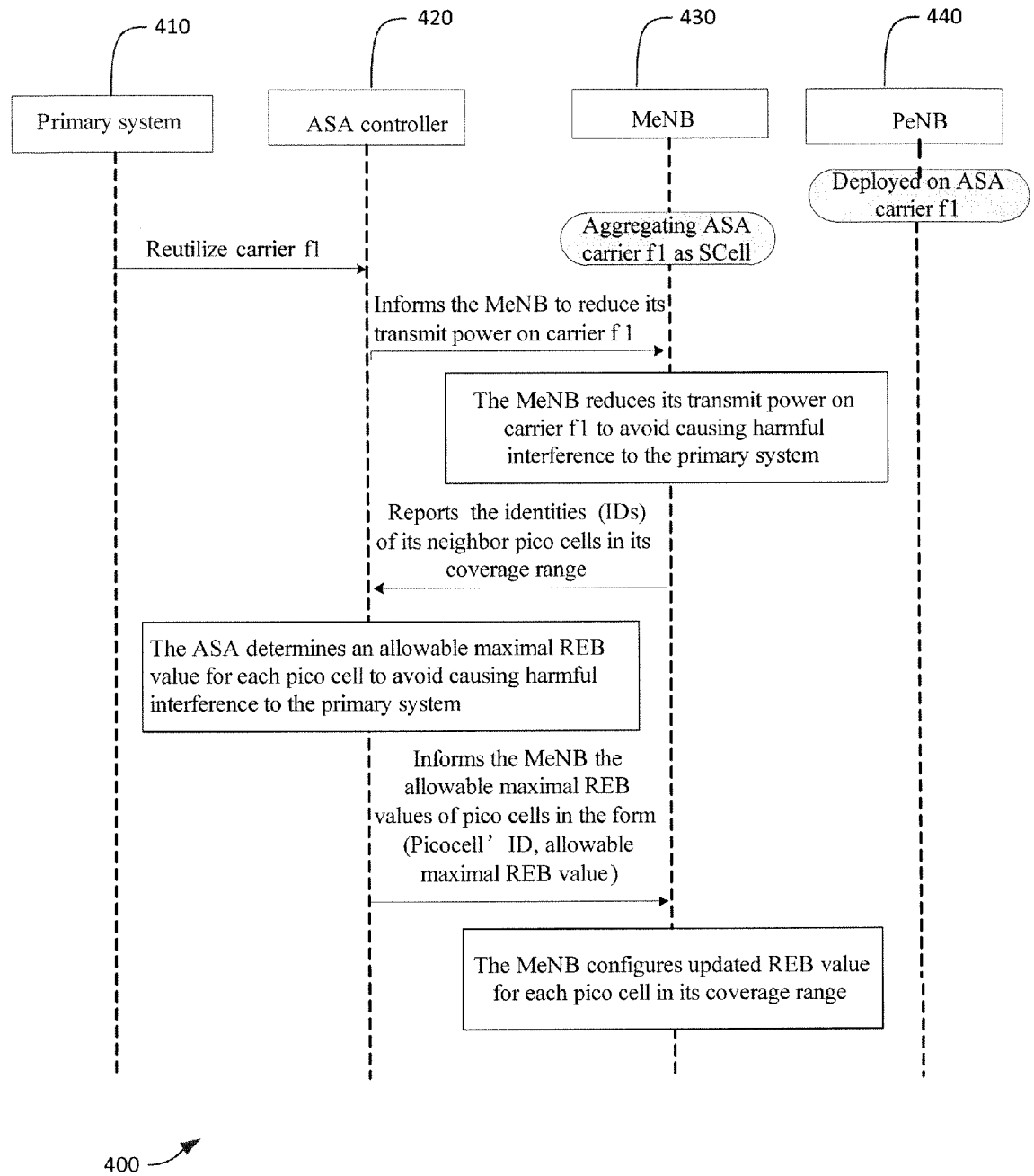
FIG. 4 illustrates signaling process of the range expansion bias (REB) configuration method for LTE macro-pico HetNets in ASA-aided spectrum sharing environments according to certain embodiments.

FIG. 4 shows the signaling process 400 of the range expansion bias (REB) configuration method for LTE HetNet networks in ASA-aided spectrum sharing environments, and the process may include the following 5 steps:

Step 1:
Upon request of reutilizing the frequency f1 by licensed primary system 410, ASA controller 420 can inform MeNB 430 to reduce the transmit power of the MeNB 430 and reduce its coverage from R to R' (see FIG. 3) on ASA carrier f1 to avoid causing unnecessary interference to the primary system by MeNB 430.

Step 2:
MeNB 430 can reduce its own transmit power on the ASA carrier f1, and thus reduce its coverage from R to R' to avoid causing unnecessary interference to primary system 410.

At the same time, MeNB 430 reports the identities (IDs), location information, and currently used REB value (if any) of the neighbor picocells of the MeNB 430 in the coverage range of the MeNB 430 to ASA controller 420.

Step 3:
According to the obtained identities (IDs), location information, and currently used REB value of MeNB's neighbor picocells, ASA controller 420 can determine an allowable maximal REB value for each picocell to avoid causing unnecessary interference to primary system 410.

Step 4:
ASA controller 420 can inform MeNB 430 of the allowable maximal REB value of each picocell in the form (picocell's ID, allowable maximal REB value).

Step 5:
After MeNB 430 obtained the allowable maximal REB values of picocells in its coverage range from ASA controller 420, MeNB 430 utilizes these REB values to configure an updated REB value for each picocell in its coverage range.

In certain embodiments a picocell can largely offload macro network, meanwhile not causing unnecessary interference to primary system 410 in ASA spectrum.

Figure 5:
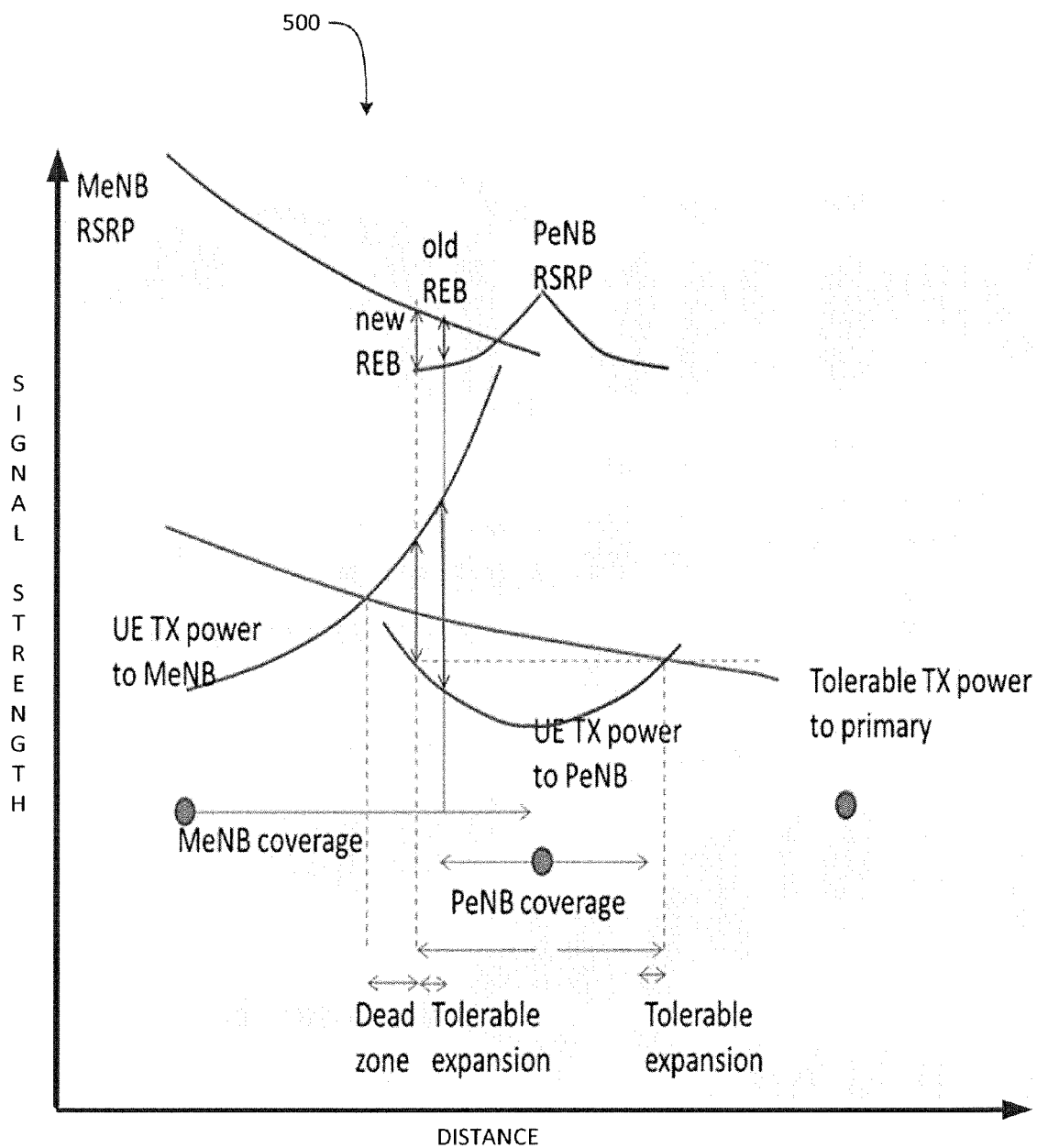
FIG. 5 illustrates a graph showing distance verses signal strength of macro-pico HetNet deployment in ASA-aided spectrum sharing environments according to certain embodiments.

FIG. 5 illustrates a graph 500 showing distance verses signal strength of macro-pico HetNet deployment in ASA-aided spectrum sharing environments according to certain embodiments. In graph 500, the horizontal axis is distance and the vertical axis is signal strength. At the top of graph 500, the received MeNB RSRP decreases the further distance away from the MeNB and from the PeNB. The initial REB (when no interference needs to be considered) is shown as the top arrowed line marked "old REB". This initial REB may also decide the PeNB coverage area.

In the middle portion of graph 500, the transmission power required from the UE to reach the MeNB or the PeNB is indicated. This transmission power increases with distance in graph 500. At old REB, the arrowed line below the UE transmission (TX) power to MeNB shows how much less the UE is transmitting to the PeNB than the UE would have if the UE were connected to the MeNB, when comparing UE TX power to MeNB to UE TX power to PeNB.

When considering the interference, transmission power that a UE at any point can transmit to stay below the acceptable interference to the primary (the rightmost dot in graph 500) is given. The further from the primary base station, the more power the UE may need to use.

The line marked as Tolerable TX power to primary (which may be the amount of power a UE connected to the PeNB could use if it is not known where the UE is located) may correspond to the cell edge of the PeNB closest to the primary. In this example, the PeNB can slightly expand the coverage area with the tolerable expansion indicated at the bottom of graph 500. Because the cell range is symmetrical, the new REB is then decided by the same tolerable expansion of the PeNB cell edge closest to the MeNB. The new REB is indicated by an arrowed line in graph 500. Therefore, any UE located between the old REB and the new REB would reduce transmission power (for example, somewhere between the old REB arrowed line and the new REB arrowed line), because it would now switch from the MeNB to the PeNB.

It can also be seen in graph 500 that there is a deadzone where it is neither allowed to transmit to the PeNB (because the RSRP difference is larger than the new REB) nor to the MeNB (because the UEs TX power to do so would be too high). If there is no deadzone, it may be unlikely that the REB would be limited by the interference allowed to the primary base station.

Graph 500 is an example where the transmission powers of the MeNB and PeNB are not changed, or changed with identical amounts. If only the transmission power of the MeNB is changed, then that will need to be reflected in the new REB value as well. For example if the MeNB RSRP is dropped 3 dB, then to keep the cell edge of the PeNB in the same spot, the REB may need to be lowered 3 dB as well.

Thus, if the Tolerable TX power to primary is lower, then the PeNB cell edge actually may have to be reduced, so the new REB may be smaller and the PeNB may actually have to drop already connected UEs back to the MeNB who will drop them then as well, and if the Tolerable TX power to primary is very low, the whole PeNB may need to be shut down.

In an example implementation, if it is assumed that the REB is expanded such that UE still served by the MeNB would start being served by the PeNB to reduce the UEs transmission power (for example, continuous coverage would be maintained between the MeNB and the PeNB), then expanding the REB reduces the UE transmission power and hence the interference because the UE will then transmit at lower power to the PeNB than it did at the same location to the MeNB.

Figure 6:
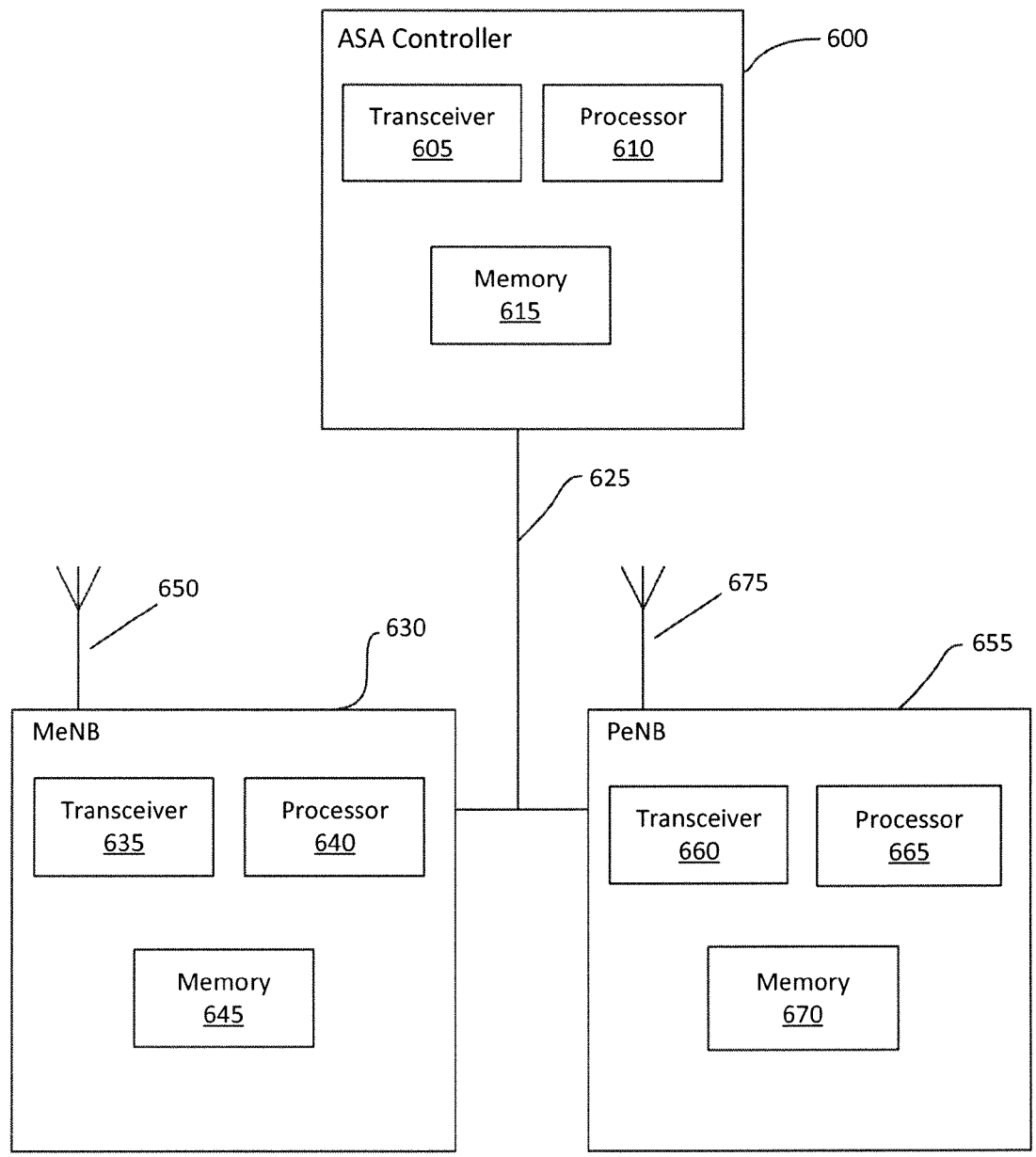
FIG. 6 illustrates a network system according to certain embodiments.

FIG. 6 illustrates a system according to certain embodiments. In one embodiment, a system may include several devices, such as, for example, controller 600, MeNB 630, and PeNB 655. Controller 600 may correspond to ASA controller 310, 420, shown in FIGS. 3 and 4, respectively. The system may include more than one PeNB, although only one PeNB is shown for the purposes of illustration.

Each of the devices in the system may include at least one processor, respectively indicated as 610, 640, and 665. At least one memory may be provided in each device, and indicated as 615, 645, and 670, respectively. The memory may include computer program instructions or computer code contained therein. One or more transceiver 605, 635, and 660 may be provided, and each device may also include an antenna, respectively illustrated as 650 and 675. Although only one antenna each is shown, many antennas and multiple antenna elements may be provided to each of the devices. Other configurations of these devices, for example, may be provided. For example, controller 600, MeNB 630, and PeNB 655 may be additionally or solely configured for wired communication 625, and in such a case antennas 650 and 675 may illustrate any form of communication hardware, without being limited to merely an antenna.

Transceivers 605, 635, and 660 may each, independently, be a transmitter, a receiver, or both a transmitter and a receiver, or a unit or device that may be configured both for transmission and reception.

Processors 610, 640, and 665 may be embodied by any computational or data processing device, such as a central processing unit (CPU), application specific integrated circuit (ASIC), or comparable device. The processors may be implemented as a single controller, or a plurality of controllers or processors.

Memories 615, 645, and 670 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and may be processed by the processors may be any suitable form of computer program code, for example, a compiled or interpreted computer program written in any suitable programming language.

The memory and the computer program instructions may be configured, with the processor for the particular device, to cause a hardware apparatus such as controller 600, MeNB 630, and PeNB 655, to perform any of the processes described above (see, for example, FIG. 4). Therefore, in certain embodiments, a non-transitory computer-readable medium may be encoded with computer instructions that, when executed in hardware, may perform a process such as one of the processes described herein. Alternatively, certain embodiments of the invention may be performed entirely in hardware.

In some embodiments the REB value may be introduced in hotspots where the operators wish to expand the size of picocells and balance the traffic load between MeNB and PeNB. REB value of a picocell may be determined by MeNB. Then MeNB may signal the REB value to both ASA controller and UE. Thus, the REB value may bias the handover thresholds. The MeNB may signal UE the REB value for a picocell. Then UE may use REB value for event A3 measurement report.

For example, in an event A3: RSRP_pico+ REB>RSRP_macro will be verified at UE. If the result is true, it may trigger UE measurement report then trigger a handover from macro to pico (receiving power of macro and picocells may be used for UE calculation).

REB is usually used in ABS (almost blank subframe) where macrocell only transmits reference signals in order that picocell gains more coverage. In normal subframes, REB value is not used. So pico only expands in ABS (REB>0), but remains the coverage in normal subframes (REB=0).

In certain embodiments control of the UE interference to primary system may be achieved. Considering the pathloss between eNB and UE, the interference at the cell edge is mainly caused by UE transmission instead of MeNB and PeNB transmissions.

The MeNB reduces coverage by reducing its own transmission power, which reduces the power of its associated UEs and the PeNB reduces coverage through the associated REB, which reduces the power of its associates UEs. So both reduce the transmission power of the associated UEs by reducing coverage area, but the coverage areas are reduced in different ways.

The REB may work under four scenarios as discussed below. With a starting scenario: REB>0 (for example, expanded range in use), transmit power of PeNB is much lower than transmit power of MeNB, UE moving towards PeNB, UE and PeNB within macro coverage.

In a first scenario where there is a drop in MeNB power and REB is kept the same may result in the UE interference to primary being reduced because MeNB power drop will make UEs handover earlier to PeNB.

For example, from event A3: RSRP_pico+ REB>RSRP_macro, if REB value keeps the same, MeNB power drop will make UEs handover earlier to PeNB. UE handover earlier to PeNB means PeNB cell coverage expansion. Then UE at the edge of PeNB will cause more interference to the primary system.

In a second scenario where there is a drop in MeNB power and REB is set to 0 may result in macro interference to the primary system being reduced, pico interference to the primary system remaining the same, and MeNB power drop may make UEs handover earlier to PeNB, but REB reduction will make UEs handover later to PeNB. Net effect depends on whether the power drop is larger than the REB value drop.

In a third scenario where there is a drop in MeNB and in PeNB power by the same amount while keeping REB the same may result in macro interference to primary being reduced, pico interference to primary being reduced, and UE interference to primary remaining the same since power drop on both eNBs keeps the point at which the handover occurs the same.

In a fourth scenario where a drop in MeNB and in PeNB power by the same amount while setting REB to 0 may result in, for example, from event A3: RSRP_pico+ REB>RSRP_macro, if MeNB and PeNB power drop the same amount, and REB value=0, then UEs handover later to PeNB. UE handover later to PeNB means PeNB cell coverage shrink. Then UE at the edge of PeNB will cause less interference to primary system. Meanwhile, offloading would shrink as well with reduced capacity.

In other words, the higher the REB, the larger the PeNB coverage, then the higher the UE interference to the primary.

In certain embodiments it may be beneficial to keep the UE within REB range so that a Pico UE can transmit with less power than macro UE due to its shorter distance to the Pico eNB. It is thus preferred to determine the maximum allowable REB value under certain interference constraints to the primary system. Otherwise, the UE will be dropped from macro coverage due to its high power UL transmission.

In some embodiments it may be advantageous to change the REBs over also changing the TX power also at the PeNB in that changing PeNB's TX power will inevitably and unnecessarily shrink the PeNB's coverage on all subframes and thus will lower PeNB's capacity if Pico UE's (in non-REB range) UL transmission would not interfere with a primary system. In other words, reducing PeNB's TX power may depend on whether Pico UE's (in non-REB range) UL transmission will interfere with primary system. Regardless of whether reducing PeNB's TX power, there may always be the issue of how to deal with the interference generated from REB range as long as operators would like to have enhanced offloading.

In some embodiments, different REB values mean different levels of coverage expansion. It is thus naturally to assume that UE will transmit with more power than in the case of REB equal to 0.

Certain embodiments can set maximum allowable REB values for picocells at ASA controller and send the values to MeNB. ASA controller may need MeNB's sending picocell location information and current used REB value in order to set such maximum allowable REB value for picocells.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS AND DEFINITIONS

ASA: Authorized Shared Access
CRE: Cell Range Expansion
eNB: evolved Node B
HetNet: Heterogeneous Network
LTE: Long Term Evolution
PeNB: Pico evolved Node B
MeNB: Macro evolved Node B
REB: Range expansion bias
ID: Identity
ABS: Almost blank subframe

We claim:

1. A method, comprising:
    determining, in a controller, at least one allowable maximal range expansion bias value for at least one picocell within a coverage area of a macrocell; and
    sending the determined at least one allowable maximal range expansion bias value for the at least one picocell from the controller to the macrocell.

2. The method of claim 1, wherein the determining is based on at least one of an interference consideration, locations of the at least one picocell, and at least one currently used range expansion bias value for the at least one picocell.

3. The method of claim 1, wherein the determining is triggered by the controller receiving an indication that a carrier frequency is to be reutilized by a primary system.

4. The method of claim 1, wherein the controller is configured as an authorized shared access controller.

5. The method of claim 1, wherein the sending the at least one allowable maximal range expansion bias value for the at least one picocell comprises sending at least one respective value in combination with at least one corresponding picocell identification code for the at least one picocell.

6. The method of claim 1, wherein the determining is based on a report received from the macrocell, wherein the report comprises at least one of at least one picocell identification code within the coverage area of the at least one macrocell, locations of the at least one picocell, and at least one currently used range expansion bias value for the at least one picocell.

7. An apparatus, comprising:
    at least one processor; and
    at least one memory including computer program code,
        wherein the at least one memory and the computer program code are configured to, with the at least one processor, cause the apparatus at least to
    determine, in a controller, at least one allowable maximal range expansion bias value for at least one picocell within a coverage area of a macrocell; and
    send the determined at least one allowable maximal range expansion bias value for the at least one picocell from the controller to the macrocell.

8. The apparatus of claim 7, wherein the determining is based on at least one of an interference consideration, locations of the at least one picocell, and at least one currently used range expansion bias value for the at least one picocell.

9. The apparatus of claim 7, wherein the determining is triggered by the controller receiving an indication that a carrier frequency is to be reutilized by a primary system.

10. The apparatus of claim 7, wherein the controller is configured as an authorized shared access controller.

11. The apparatus of claim 7, wherein the sending the at least one allowable maximal range expansion bias value for the at least one picocell comprises sending at least one respective value in combination with at least one corresponding picocell identification code for the at least one picocell.

12. The apparatus of claim 7, wherein the determining is based on a report received from the macrocell, wherein the report comprises at least one of at least one picocell identification code within the coverage area of the at least one macrocell, locations of the at least one picocell, and currently used range expansion bias vales for the at least one picocell.

13. A method, comprising:
    receiving at least one allowable maximal range expansion bias value for at least one picocell from a controller; and
    updating, by a macrocell, at least one range expansion bias value for at least one picocell within a macrocell based on the received at least one allowable maximal range expansion bias value.

14. The method of claim 13, further comprising:
    reporting a list comprising at least one of at least one picocell identification code corresponding to the at least one picocell within a coverage area of the macrocell, locations of the at least one picocell, and at least one currently used range expansion bias value for the at least one picocell, wherein the at least one allowable maximal range expansion bias value is received in response to the list.

15. The method of claim 14, further comprising:
    receiving instructions to reduce transmit power of the macrocell on a carrier frequency, wherein the reporting the list is responsive to the received instructions.

16. The method of claim 13, wherein the macrocell comprises an evolved Node B.

17. An apparatus, comprising:
    at least one processor; and
    at least one memory including computer program code, wherein the at least one memory and the computer program code are configured to, with the at least one processor, cause the apparatus at least to receive at least one allowable maximal range expansion bias value for at least one picocell from a controller; and update, by a macrocell, at least one range expansion bias value for at least one picocell within a macrocell based on the at least one received allowable maximal range expansion bias value.

18. The apparatus of claim 17, wherein the at least one memory and the computer program code are configured to, with the at least one processor, cause the apparatus at least to report a list of at least one of at least one picocell identification code corresponding to the at least one picocell within a coverage area of the macrocell, locations of the at least one picocell, and at least one currently used range expansion bias value for the at least one picocell, wherein the at least one allowable maximal range expansion bias value is received in response to the list.

19. The apparatus of claim 18, wherein the at least one memory and the computer program code are configured to, with the at least one processor, cause the apparatus at least to receive instructions to reduce transmit power of the macrocell on a carrier frequency, wherein the reporting the list is responsive to the received instructions.

20. The apparatus of claim 17, wherein the macrocell comprises an evolved Node B.

\* \* \* \* \*